May 19, 1925.  1,538,416

N. W. TRAUTNER
GREASE RETAINER
Filed Jan. 3, 1924   2 Sheets-Sheet 1

Inventor
N. W. Trautner
By C. A. Snow & Co.
Attorneys

May 19, 1925.　　　　　　　　　　　　　　1,538,416
N. W. TRAUTNER
GREASE RETAINER
Filed Jan. 3, 1924　　　　2 Sheets-Sheet 2
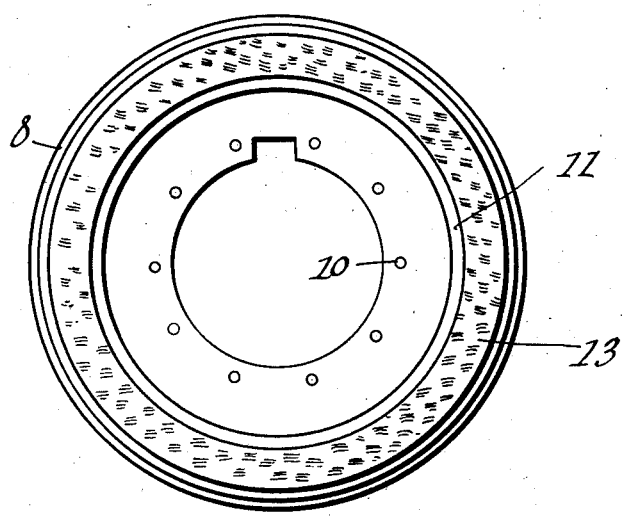
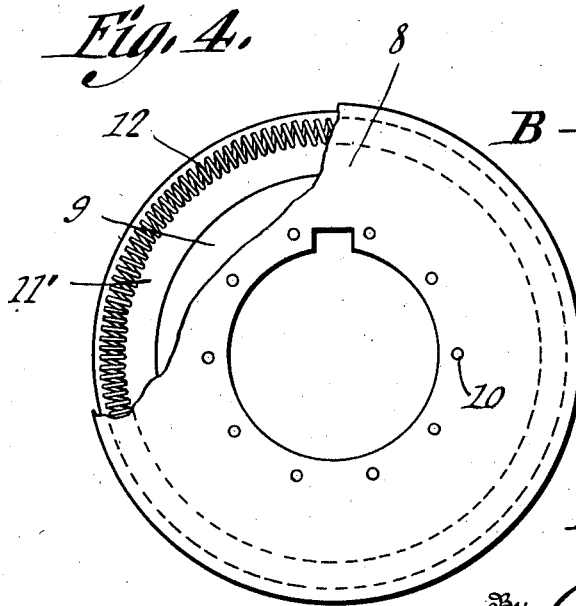
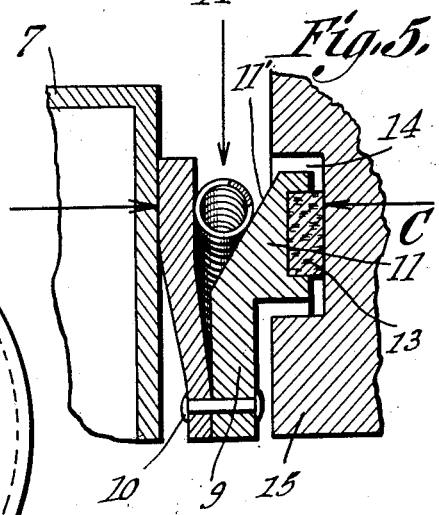
Inventor
N. W. Trautner
By C. A. Snow & Co.
Attorneys Patented May 19, 1925.

1,538,416

UNITED STATES PATENT OFFICE.

NICHOLAS W. TRAUTNER, OF ST. PAUL, MINNESOTA.

GREASE RETAINER.

Application filed January 3, 1924. Serial No. 684,270.

*To all whom it may concern:*

Be it known that I, NICHOLAS W. TRAUTNER, a citizen of the United States, residing at St. Paul, in the county of Ramsey and State of Minnesota, have invented a new and useful Grease Retainer, of which the following is a specification.

The present invention has reference to grease retaining devices and more particularly to an automatically adjustable packing ring adapted to prevent the grease usually contained in the axle housing of a motor vehicle from passing between the ends of the axle housing and wheels positioned on the axle.

Another important object of the invention is to provide a device of this character which may be readily and easily applied, eliminating the necessity of making alterations in the usual motor vehicle constructions to position the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a front elevational view of the packing ring.

Figure 4 is a rear elevational view of the packing ring, the leather washer thereof being partly broken away.

Figure 5 is an enlarged fragmental sectional view of the ring and hub of the wheel.

Figure 1:
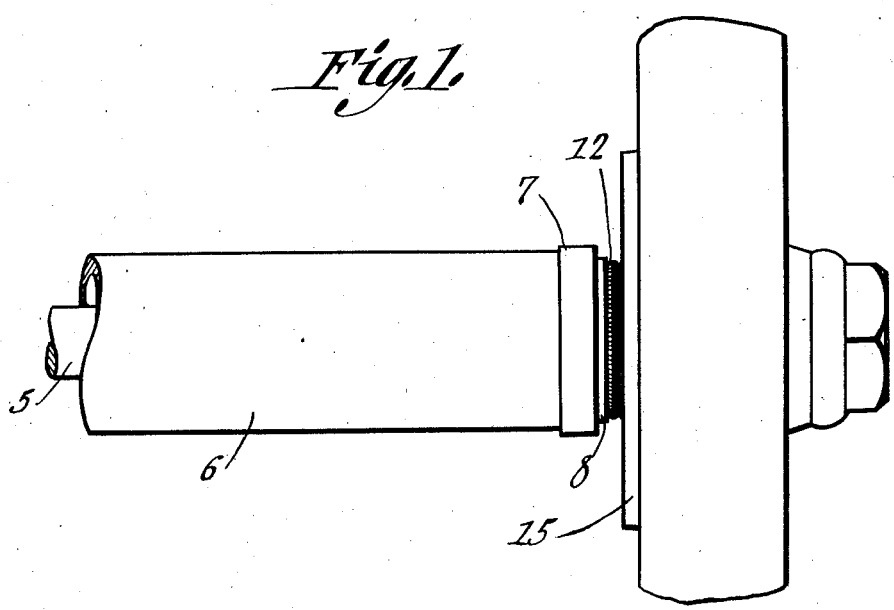
Figure 1 is a fragmental elevational view disclosing the grease retaining member as applied to an axle.
Figure 2:
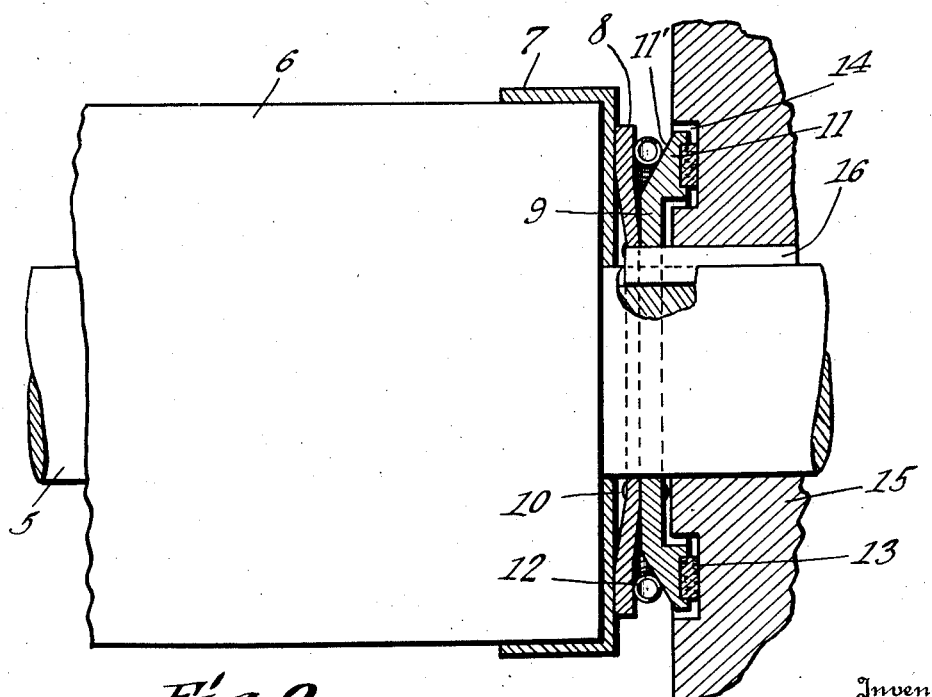
Figure 2 is a fragmental elevational view of an axle and axle housing, the wheel supported on the axle being shown in section.

Referring to the drawings in detail, the reference character 5 designates the usual rear axle of a motor vehicle such as a truck or the like, the axle housing being indicated at 6.

The reference character 7 designates the housing cap positioned at one end of the housing 6, and which provides a bearing surface for the washer 8, forming a part of the grease retainer, the washer 8 being formed preferably of leather. This washer has connection with the body portion 9, by means of the rivets 10 which body portion 9 is in the form of a metallic disk provided with an enlargement 11, which is formed with an inclined inner edge 11' providing a supporting surface for the coiled spring 12 which is stretched over the washer 8 and positioned between the washer and enlargement 11, the contractal force of the spring being sufficient to urge the washer 8 away from the enlargement 11.

As shown, the enlargement 11 is formed with a circular groove forming a seat for the cork washer 13 which operates in the usual ring groove 14 of the hub section 15 of a wheel, thereby insuring a fluid-tight connection between the body portion 9 and the wheel hub.

The wheel hub and retainer forming the subject matter of the present invention are keyed to the axle by means of the usual key 16, whereby the body portion, hub and leather washer rotate together.

From the foregoing it will be obvious that as the washer 8 wears, the coiled springs will act to force the washer 8 away from the body portion to compensate for such wear and insure a fluid-tight connection at all times.

I claim:—

A grease retainer including a circular metallic body portion, an enlargement formed on the body portion and disposed adjacent to the periphery thereof, said enlargement having a cut out portion providing a washer seat, a washer in the washer seat and adapted to engage a hub section against which the device is positioned, said enlargement having a beveled inner surface, a washer of flexible material of a diameter to overlie the body portion, said last mentioned washer being secured to the metallic body portion, and a coiled spring positioned between the last mentioned washer and body portion and adapted to rest on the beveled surface of the body portion for normally urging the body portion away from the last mentioned washer.

In testimony that I claim the foregoing as my own, I have hereto affixed my signature in the presence of two witnesses.

NICHOLAS W. TRAUTNER.

Witnesses:
F. J. MARSH,
JULIA A. MILLER.